United States Patent
Brown et al.

(10) Patent No.: US 7,260,570 B2
(45) Date of Patent: *Aug. 21, 2007

(54) RETRIEVING MATCHING DOCUMENTS BY QUERIES IN ANY NATIONAL LANGUAGE

(75) Inventors: Gregory T. Brown, Rockhart, GA (US); Yurdaer Nezihi Doganata, Chestnut Ridge, NY (US); Youssef Drissi, Ossining, NY (US); Tong-Haing Fin, Harrison, NY (US); Noon Ju Kim, Wappingers Falls, NY (US); Lev Kozakov, Stamford, CT (US); Juan Leon-Rodriquez, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 320 days.

This patent is subject to a terminal disclaimer.

(21) Appl. No.: 10/180,195

(22) Filed: Jun. 26, 2002

(65) Prior Publication Data

US 2003/0149687 A1 Aug. 7, 2003

Related U.S. Application Data

(63) Continuation-in-part of application No. 10/066,346, filed on Feb. 1, 2002, now Pat. No. 6,952,691.

(51) Int. Cl.
*G06F 17/00* (2006.01)
*G06F 7/00* (2006.01)

(52) U.S. Cl. .............. 707/4; 707/3; 707/101; 707/102; 707/103 R; 707/104.1; 715/532; 715/536

(58) Field of Classification Search .......... 707/1, 707/3, 10, 101, 102, 103 Y, 104.1, 5, 4, 103 R; 715/532, 536

See application file for complete search history.

(56) References Cited

U.S. PATENT DOCUMENTS 5,991,713 A 11/1999 Unger et al. ............ 704/9

(Continued)

FOREIGN PATENT DOCUMENTS

| EP | 0 964 344 A2 | 12/1999 |
|----|---|---|
| EP | 1 072 984 A2 | 1/2001 |

OTHER PUBLICATIONS

Salton, G., "Automatic Processing of Foreign Language Documents", 1969, Intenational Conference On Computational Linguistics, Proceedings of the 1969 Conference on Computational Linguistics, pp. 1-28.*

(Continued)

*Primary Examiner*—Thuy N. Pardo
(74) *Attorney, Agent, or Firm*—Norman Gundel

(57) ABSTRACT

Search time is reduced with a search engine that includes a bi-directional inverted index facility which can be accessed with a keyword search in one of a number of languages and provide a listing of documents contained in all of those languages. The keywords in all supported languages are preferably stored in an inverted index lookup table cross referenced to documents in those language containing the keywords. Keywords with the same meaning in different languages are accessible together when that keyword in one of the languages is queried. The search engine containing the table can identify pertinent documents either in a selected language, a second language or in all supported languages, as determined by the user. Information about each document can include not only the identity of the document but also information used in ranking the documents such as the number of times that a keyword appears in that document, and the keywords proximity to other keywords. The use of the inverted index table therefore reduces search time by eliminating the need for translation of keywords, their identification in documents and accumulating of ranking information at search runtime and avoids inaccuracies which may result from full text translations of documents.

21 Claims, 5 Drawing Sheets

U.S. PATENT DOCUMENTS

| | | | | |
|---|---|---|---|---|
| 6,055,528 | A * | 4/2000 | Evans | 707/3 |
| 6,226,638 | B1 * | 5/2001 | Okura et al. | 707/5 |
| 6,275,789 | B1 | 8/2001 | Maser et al. | 704/7 |
| 6,278,967 | B1 | 8/2001 | Akers et al. | 704/2 |
| 6,602,300 | B2 * | 8/2003 | Ushioda et al. | 715/536 |
| 7,027,974 | B1 * | 4/2006 | Busch et al. | 704/4 |
| 7,124,364 | B2 * | 10/2006 | Rust et al. | 715/532 |
| 2002/0007384 | A1 * | 1/2002 | Ushioda et al. | 707/536 |
| 2003/0221171 | A1 * | 11/2003 | Rust et al. | 715/532 |

OTHER PUBLICATIONS

Ziviani, N.,de Moura, E., Navarro, G., Baeza-Yates, R., "Compression: A Key for Next-Generation Text Retrieval Systems", Nov. 2000, IEEE Computer, vol. 33, No. 11, pp. 37-44.*

Yergeau, F., "RFC 2279—UTF-8,m A Transformation Format of ISO 10646," Jan. 1998, published on the web at <http://www.faqs.org/rfcs/rfc2279.html>.*

Chung-hsin Lin et al., "An Automatic Indexing and Neural Network Approach to Concept Retrieval and Classification of Multilingual (Chinese-English) Documents", IEEE, 1996, pp. 75-88.*

Schiel et al., "SIM-a system for semi-automatic indexing of multilingual documents", IEEE, 1999, pp. 577-581.*

Piek Vossen, "EuroWordNet: a multilingual database for information retrieval", EuroWordNet, Mar. 5-7, 1997.*

Peters, C. et al Multilingual Access for Information Systems Aug. 16-24, 2001, 67th IFLA Council & general conference pp. 2-8.

Soergel, D "Multilingual thesaurus is Cross-language text & speech retrieval" Mar. 1997, AAAI Spring Symposium pp. 164-169.

Hull, D. et al "Querying Across Languages. Dictionary- Based Approach to Multilingual Info Retrieval" Aug. 18, 1996- 19th Annual ACMSigir Conf- pp. 49-57.

* cited by examiner

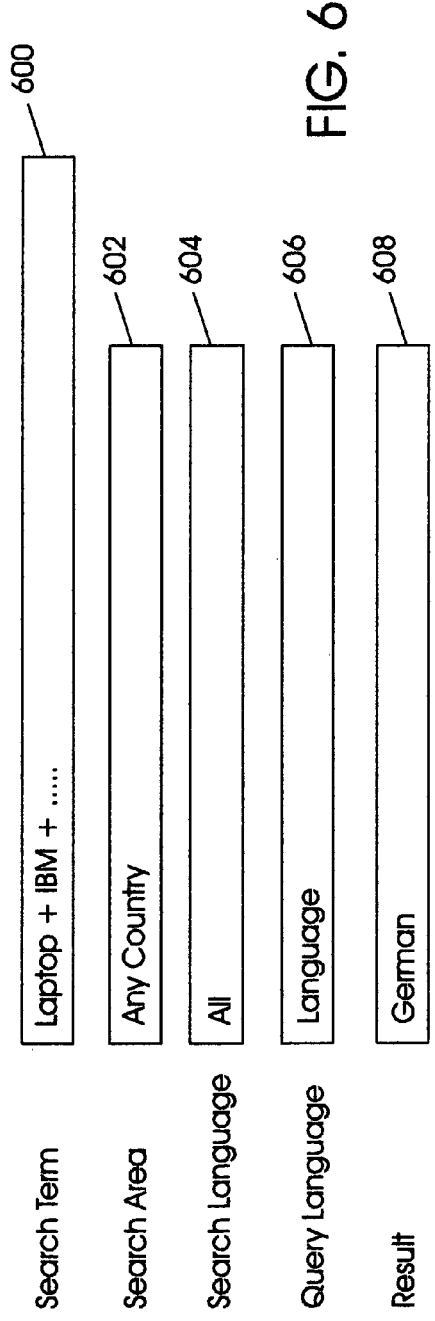

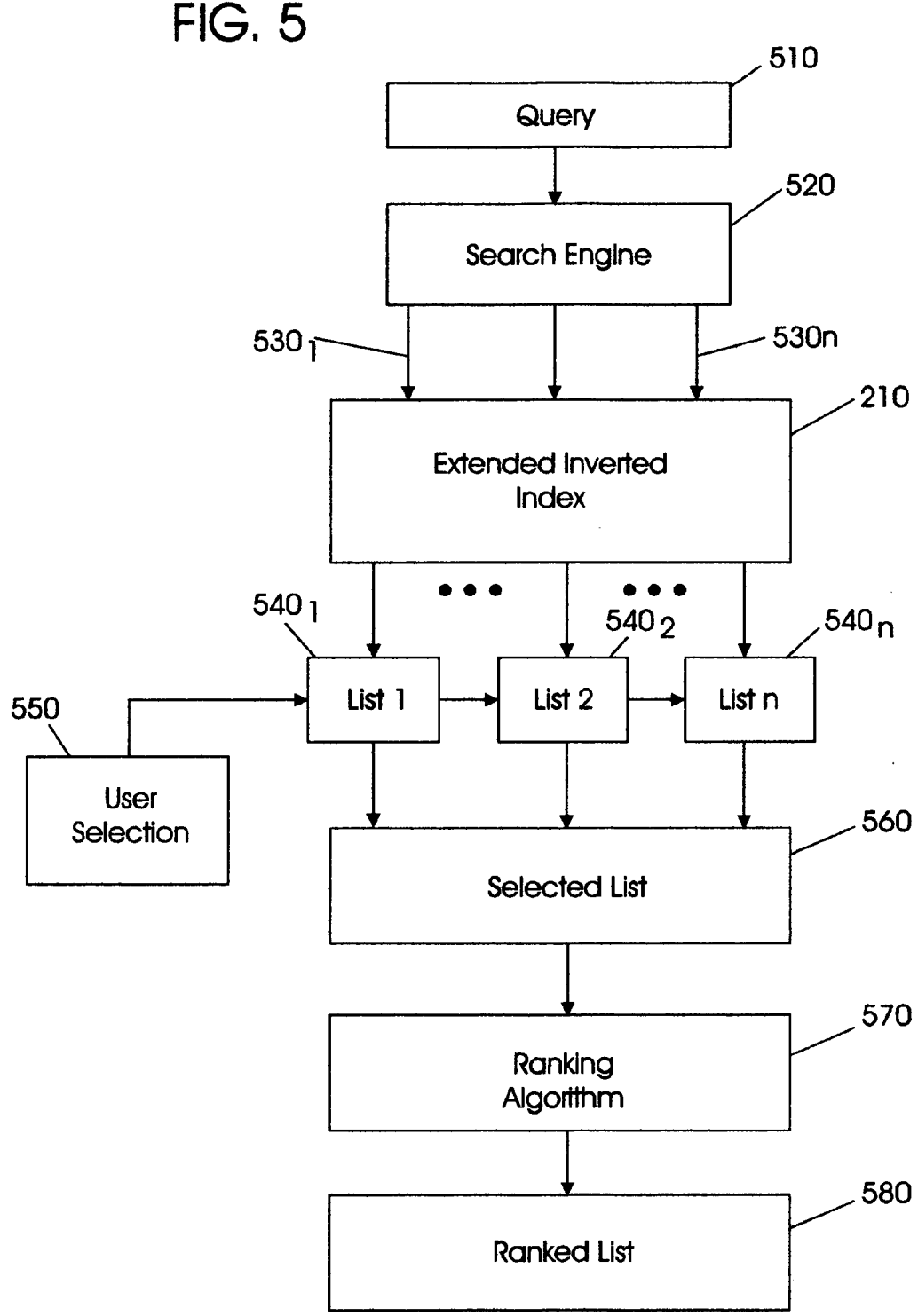

RETRIEVING MATCHING DOCUMENTS BY QUERIES IN ANY NATIONAL LANGUAGE

RELATED APPLICATIONS

This application is a continuation-in-part of U.S. patent application, Ser. No. 10/066,346 (CHA920010230US1) filed on Feb. 1, 2002 and entitled "Method and System for Searching a Multi-lingual Database" which patent application issued into U.S. Pat. No. 6,952,691B2 on Oct. 4, 2005.

U.S. Copending application Ser. No. 10/120,071 filed on Apr. 10, 2002 and entitled "Promoting Strategic Documents by Bias Ranking of Search Results on a Web Browser" is hereby incorporated by reference.

FIELD OF THE INVENTION

The present invention relates to the field of searching a database using search keyword terms entered by a user. More particularly, the present invention is a system and method for searching databases including documents in different languages where the search terms are entered in one of the database languages and applicable database documents in different languages are identified.

BACKGROUND OF THE INVENTION

Various approaches have been proposed for searching a database wherein the database includes material in multiple languages. One approach is to translate the entire database into the language in which a search term is entered or the language of the user. However, this could involve a large amount of translation for a sizable database (and multiple translations if the database is used by users in different languages). Further, each process of translating a document has the potential for losing (or distorting) some of the meaning of the original text.

Another approach is to use synonym or keyword dictionary as described in the above mentioned copending application. The system of the copending application includes a synonym or keyword dictionary which is bi-directional and allows for translation of keywords between a first language and other languages. The translated words keywords for the document are stored in an inverted index which is then used for searching, either in a selected language, a second language or in all languages, as determined by the user. This use of multiple searching and a translated synonym dictionary avoids the need for translation of the entire document and avoids the mentioned inaccuracies which may result from translations of the whole database. However, performing and analyzing such a search can take a long period of time which may prevent the user from interactively modifying the search to obtain meaningful results.

BRIEF DESCRIPTION OF THE INVENTION

In accordance with the present invention, search time is reduced with a search engine that includes a bi-directional inverted index facility which can be accessed with a keyword search in one of a number of languages and provide a listing of documents contained in all of those languages. The keywords in all supported languages are preferably stored in an inverted index lookup table cross referenced to documents in those language containing the keywords. Keywords with the same meaning in different languages are accessible together when that keyword in one of the languages is queried. The search engine containing the table can identify pertinent documents either in a selected language, a second language or in all supported languages, as determined by the user. Information about each document can include not only the identity of the document but also information used in ranking the documents such as the number of times that a keyword appears in that document, and the keywords proximity to other keywords. The use of the inverted index table therefore reduces search time by eliminating the need for translation of keywords, their identification in documents and accumulating of ranking information at search runtime and avoids inaccuracies which may result from full text translations of documents.

Therefore, it is an object of the present invention to provide an improved searching engine for documents in multiple languages.

It is another object of the invention to reduce runtime translation of keywords and finding documents containing those keywords.

A further object of the present invention is to allow for the searching of a database with keywords in any supported language to find documents which are written in that and any other supported languages.

BRIEF DESCRIPTION OF THE DRAWINGS

Figure 1:
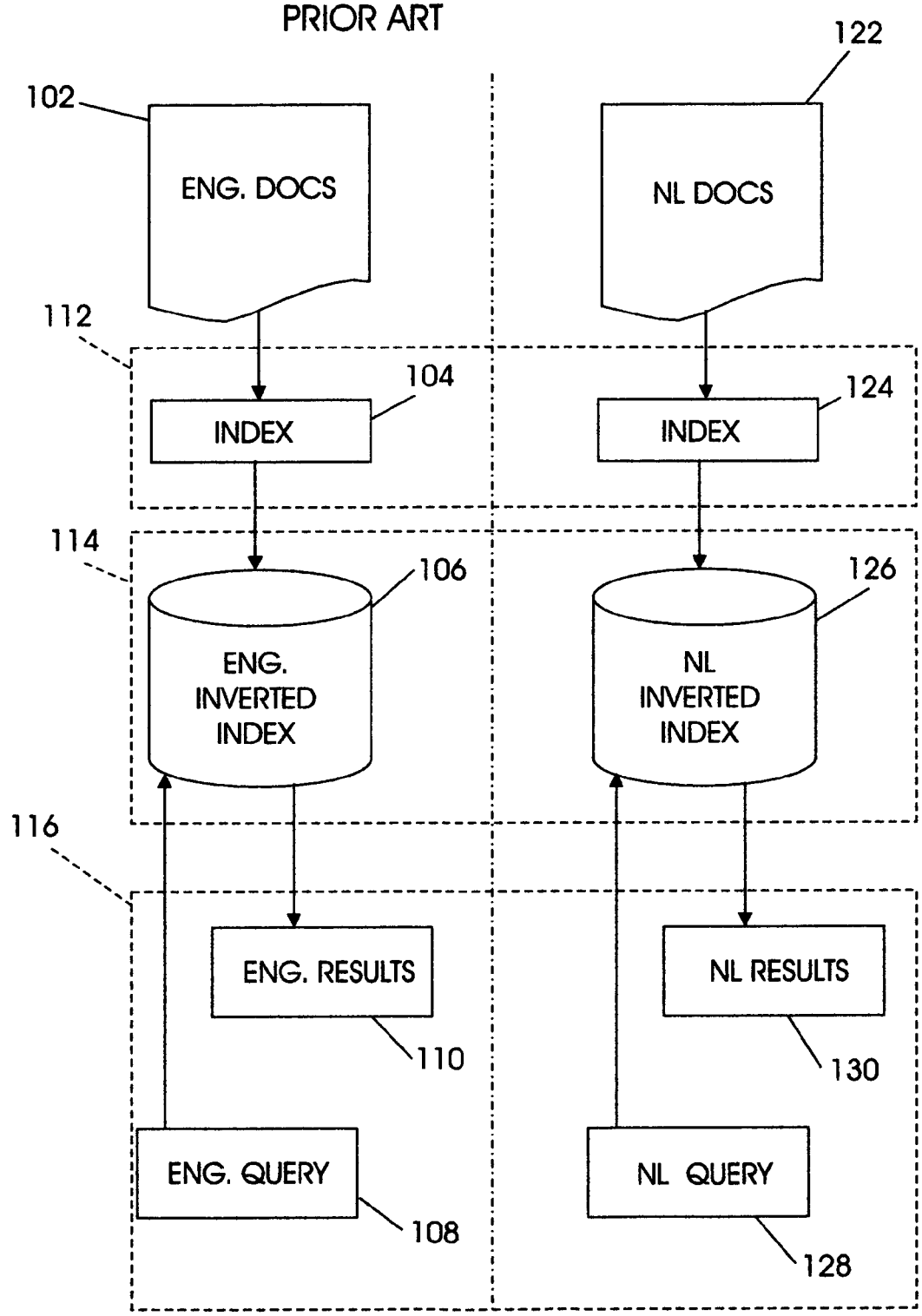
Figures 2, 3:
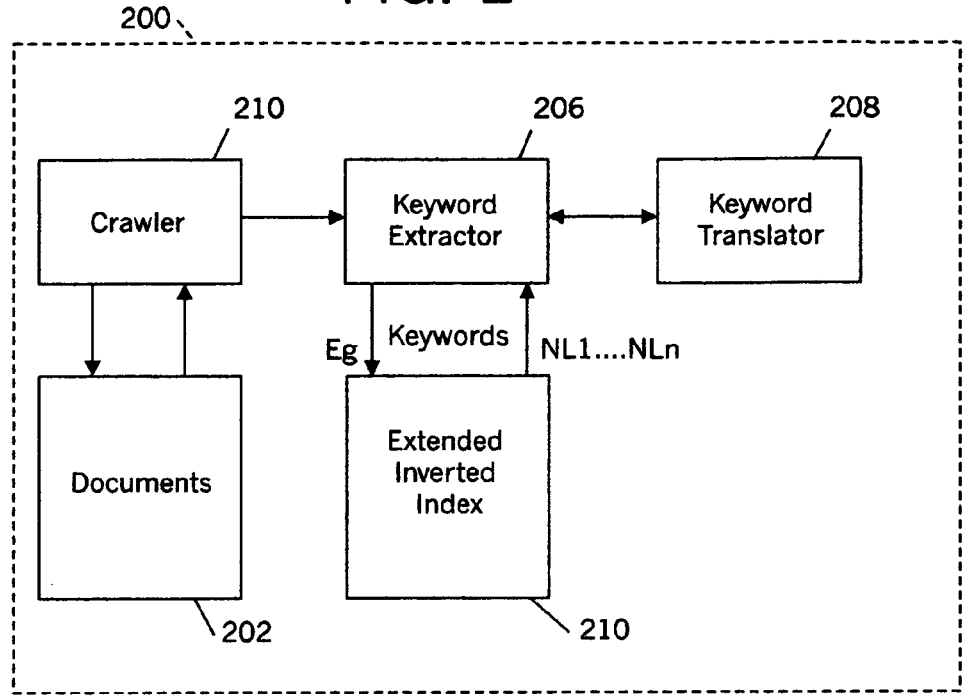
Figure 7:
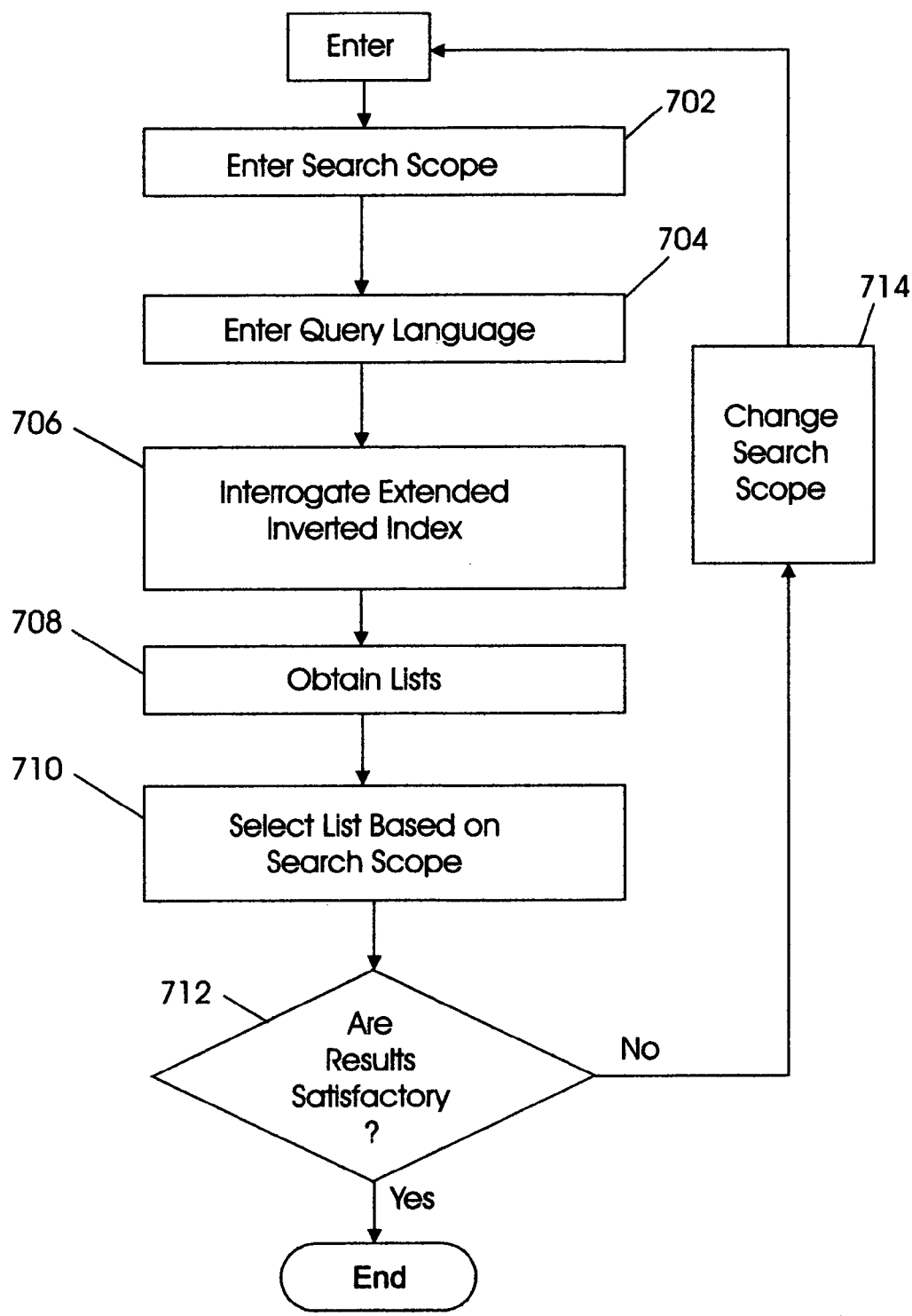

Having thus described some of the object and advantages of the present invention, other objects and advantages will be apparent to those skilled in the art in view of the following description of the invention taken in conjunction with the accompanying drawings of which:

FIG. 1 is a diagrammatic view of a traditional search technique in which documents exist in two different languages;

FIG. 2 is a diagrammatic view of a diagram of an improved multi-language document database index system and inverted index table of the present invention;

FIG. 3 is a diagram of an index table of the present invention associating keywords in one language with their counterparts in other languages and identifying documents in all such languages containing queried keywords;

FIG. 4 is a diagram of a portion of a synonym table;

FIG. 5 is a diagram of a multi-language database search system of the present invention;

FIG. 6 is a diagram of a a portion of a computer display screen that can be used to enter search queries to a search system incorporating the present invention; and FIG. 7 is a flow chart illustrating sample logic performed in practicing the present invention.

DETAILED DESCRIPTION OF THE PREFERRED EMBODIMENT

FIG. 1 illustrates a traditional search system in which documents in English (a first language) are represented by the symbol 102 and the documents in a second language such as a national language (NL) are represented by the symbol 122. While each set of documents is maintained separately, each is indexed through a process of extracting the keywords and creating an index, represented by the box 104 for the English documents 102 and the box 124 for the second language documents 122. The next step is that an inverted index is performed for each set of documents, the English inverted index at block 106 and the second language index represented by block 126. Then, a search or query is formatted and applied against a selected one of the databases, represented by an English query at 108 and a national language query at block 128. The results of the English query are shown by block 110 and the results of a national language query are represented by the box 130. Thus, the steps of the process are carried out separately for each database and including indexing the document at block 112, creating an inverted index at block 114 and conducting a search and providing an output at block 116.

The steps are the same regardless of the database, each database is kept separate and each is searched separately and each generates separate results. Since this same structure could be applied to any number of separate databases, this system could expand to support the number of languages desired. However, some technical documents are written in a native language (such as Spanish) but use technical terms from another language (for example, from English). In such a system, searching the national language database for the national language equivalent of a search term will not find the search term if it is included in the document in another language. Also in such a system, searching a national language may not uncover documents dealing with the searched subject matter in a multiplicity of different languages.

FIG. 2 illustrates a system for merging keywords in documents in different languages into a single extended keyword index table that is shown in FIG. 3. As shown in FIG. 2, documents in a database 200 in any language (say English) are represented by the symbol 202. Keywords from each document in the database are identified off-line by using a crawler 204 which scans the documents for an extractor 206 which identifies the keywords in the documents text. The extracted English keywords are then translated to other supported languages using the keyword translator 208 to create an extended inverted index 210 of the keywords with synonymous meanings in all supported languages. The translation of keywords is preferably accomplished using a keyword dictionary 212 which includes English keywords associated with the keywords with a corresponding meaning in other national languages to form a synonymous listing for the index of FIG. 3 which effectively lists each keyword in each supported language keywords with corresponding meaning in the other supported language. In order to manage the various languages, it is proposed to translate each keyword using the Unicode system (UTF8), although any other system which is accurate and consistent could also be used to advantage in the present invention. While English is described as one language for the interrogating documents for the keywords, the present invention is not limited to interrogating documents in English for keywords. Any supported language En, $NL_1, \ldots NLi \ldots NLn$ can be used to find keywords in documents not found in English.

A more detailed view of the extended index table 210 of FIG. 2 is shown in FIG. 3. English keywords K1 to Kn are extracted from the documents D1 to Dn using the method described in connection with FIG. 2. The corresponding keywords in all supported national languages are obtained as described above so that for each English keyword Ki there is a synonymous keyword for every supported language. As shown in FIG. 3, an X indicates documents D1 to Dn in which the one or more of the listed keywords appear. Thus, as shown, the keyword K1 appears in documents D1 and Dj in English and keywords K11 and K12 with a synonymous meaning are in documents national languages NL1 and NL2. Similarly, synonymous keywords Ki1 and Ki2 are in document D2 which is available in national languages NL 1 and 2 but not available in English. Synonymous keywords Kn and Kn2 are in document Dj which is available in English and national language NL2 but not available in national language NL1. Stored in each location marked with an X is ranking factor information such as; the number of times the word appears in the document, its proximity to other keywords appearing in the document; the type of document containing the keyword (i.e. a technical magazine or an advertisement), etc. This information is then used to rank each document relative to the other documents turned up by the search.

When the table of FIG. 3 is interrogated by the keywords in any supported language, the documents in any language containing keywords with synonymous means to the keywords in the query are identified and provided with their ranking information. For instance, assume the query contains keywords Ki and Kn documents D2 to Dj and Dn would be identified in their available languages. Thus in the case of document D2, the document would be identified as being available in English and national language NL1 and NL2 while documents Dj would be available in national languages NL1 and NL2. Along with the identifying of the documents either by title or filing number, the stored ranking factor information would be provided to the document ranking algorithm such as the one shown in copending U.S. patent application Ser. No. 10/120.071, filed on Apr. 10, 2002 and incorporated herein by reference.

FIG. 4 shows a portion of keyword synonym table 400 useful in producing the extended inverted index of FIG. 3. The table includes a plurality of columns, each associated with a different supported language. As shown, these supported languages are English in column 410, Spanish in column 420, French in column 430 and Italian in column 440. An additional column 450 is shown provided for any other supported language such as German or Japanese, recognizing, or course, that some languages have different type of characters from English and some languages have so many different symbols that it may be necessary to use a double byte character set to represent some of such languages like Japanese. Two sets of synonyms are shown in rows in this FIG. 4, one associated with the English word "network" in row 460 and one associated with the English word "processor" in row 470. In practice, the synonym table 400 may have additional columns as desired as shown by the symbol 490 (or may have fewer columns if fewer languages are supported and the selection of supported languages is a matter of design choice and not a feature of the present invention) and will have a row for each keyword, shown by the symbol 480. It is important to note that each entry is associated with a language so that it is possible to associate a word with its language and distinguish between the Spanish word for network (red) from the English word for the color red, if desired. While the table is shown in tabular form for each in understanding the concept of a synonym table, the table may exist in other known formats in storage according to conventional data processing techniques.

FIG. 5 illustrates a search system incorporating the present invention. A query 510 in any supported language is inputted to a search engine 520 and passed to a extended keyword inverted index 210 described in connection with FIGS. 2 and 3. The index 210 supports a plurality of languages and allows translation of a keyword query in any supported language. In the case of an English language query, the query is applied to the inverted index 210 using the listings in language keywords $530_1$ and the keywords $530_2$ to $530n$ in other supported languages. This generates an English-language hit list $540_1$ and national language hit lists $540_2$ to $540n$. The user then can select results $540_1$ to $540n$ in any language of interest to the user. It is possible that the user will select one list (say list $540_2$), determine that it is inappropriate and try another selection. If the user has limited capabilities in understanding English, he may prefer to look at the results in any other national language $540_2$ to $540\ n$. If the national language results (say $540_i$) are not sufficient (or nonexistent), the user may go on to the English language results $540_1$. In the alternative, the user may recognize that the results of interest are most likely to be the English results 5401 and may start with those results. In another alternative, the user finds so many results in English that he decides to review the more selective list in his national language 550. Where national language results are skimpy or unavailable, the search engine will provide documents in other languages to increase search results listed in the selected list 560 with English being the default listing language with documents unavailable in English provided in languages which they are available. The documents in the selected list are analyzed by the ranking algorithm 570 to provide a ranked list 580 to the user.

As shown in FIG. 6, a computer screen for interrogating the present system would include spaces to enter the keyword query 600. Search area 602 is for indicating the scope of the search. Search area 604 is to specify the languages to be searched. Area 606 is to indicate the language in which the query terms are provided, and space 608 is used to provide the language in which the ranking list is to be provided. Thus in the figure "laptop" and "IBM" are keywords to be examined. The search area is "any country". However if desired, the search could be restricted say to particular countries or even to particular document repositories. For instance, search area could be limited to the Library of Congress or to any library in the United States. Languages in which the search is to be performed is listed as all. This would results in a search in all supported languages contained in the table of FIG. 3 so that the multiple copies of the same documents would be read out of the table, as discussed in connection with FIG. 3. Space 606 identifies the fact that the search words are in English. However, any other of the supported languages can be used. For instance, if German is a supported language the search terms 600 could be German words and the query language would indicate that they are German. Finally the results can be provided in a language that is different from the query language so that as shown here, though the search terms are in English, the ranked documents would be provided in German to the extent that those documents are available in German. If any document was not available in German, the listing would contain that document in a language which it is available with English as the first default language. The use of the described spaces 600 to 608 permits control over its scope and languages in which the search is performed and the results delivered.

Referring now to FIG. 7, the system is interrogated by a user entering in steps 702 and 704 the search information set forth in spaces 600 to 608 in FIG. 6. The entered query and other information is then used to interrogate the extended inverted index table in step 706 and a document list is obtained from the table 210. The searcher is then provided with the list of ranked documents in the language he prefers in step 710 and decides in step 712 whether the results are satisfactory. If they are, the process ends. However if the searcher is unsatisfied, he may extend or otherwise change the scope of his search in step 714 by modifying the data provided in steps 702 and 704.

The present invention, it will be recognized, is especially adapted for use in a data processing system such as a general purpose computer with a stored program containing computer program means including a plurality of instructions. Those instructions will generally be written in a high level language which is readable by a human and translated into machine language, that is, simple instructions which are understood by the data processing system. In an appropriate instance such instructions could be directly written in a machine language programming language, if desired, a system which allows for efficiency of execution but which is more difficult to program. The present invention is not limited to any particular input language. U.S. copending patent application, Ser. No. 10/120,071 filed on Apr. 10, 2002, discloses a network applicable for use with the present invention. The subject matter of that application is hereby incorporated by reference. In the system shown in FIG. 1 of that application software of the present invention can be provided on servers and can be accessed over the internet using computers on which the display presentation of FIG. 6 herein would appear.

As used in the present document, software, computer program and computer program means are used interchangeably. Software in the present context means any expression, in any language, code or notation, or a set of instructions intended to cause a system having an information processing capability to perform a particular function either directly or after either or both of the following:

a) conversion to another language, code or notation; b) reproduction in a different material form. The use of the Unicode system for managing different languages has been used in the description of the preferred embodiment but other suitable methods for representing different languages could also be used to advantage in the present invention, if desired.

The term national language(s) has been used to represent a language or languages associated. A national language could be any language supported by the system, and might include different languages for different users. So, "national language" might represent Spanish for a Mexican or a person from Spain and might represent French for a person from France of other French-speaking locales. Appropriate synonym tables are available for a variety of common languages as are system for locating keywords and separating common text with little uniqueness from keywords which are descriptive of the document under consideration. Such keyword locating systems are often technologically directed and identify words which are of interest to the technology under consideration.

Of course, many modifications of the present invention will be apparent to those skilled in the relevant art in view of the foregoing description of the preferred embodiment, taken together with the accompanying drawings and the appended claims. For example in some circumstances, the documents could be written in a combination of supported languages. Additionally, some elements of the present invention can be used to advantage without the corresponding use of other elements. For example, the use of the synonym or keyword dictionary is not the only way to accomplish the translation of keywords into other languages. Further, various other devices could be substituted to advantage depending on the environmental circumstances. Accordingly, the foregoing description of the preferred embodiment should be considered as merely illustrative of the principles of the present invention and not in limitation thereof.

Having thus described the invention, what is claimed is:

1. A method of creating and searching a database of documents in a plurality of supported languages, the method comprising the steps of:

using a keyword dictionary to extract keywords from the documents;

translating the keywords in one of the supported languages into keywords with synonymous meanings in the other supported languages;

creating a listing of the keywords for each supported language;

using the listings of keywords in each supported language to create an inverted index for identifying documents in all supported languages containing the keywords, and for associating with each keyword in all supported languages ranking factor information relative to the use of the keywords in the identified documents;

retrieving a document in one supported language from the database by interrogating the inverted index using a query with search terms in the one supported language and converting the search terms in the one supported language to search terms with synonymous meanings in other supported languages to enable searching the document in the one supported language with search terms from the inverted index in both the one and a different one of the supported languages; and ranking the retrieved documents using the ranking factor information of the documents associated with the keywords in the inverted index.

2. A method including the steps of claim 1, wherein the step of using the keywords to create the inverted index includes the step of using a Unicode system to manage supported languages.

3. The method of claim 1, wherein sources to be searched for documents in the database can be set to particular document depositories, depositories in particular countries and/or all sources.

4. The method of claim 1, wherein the ranking factor information includes the number of times the keyword appears in the identified document and the proximity of the keyword to other keywords appearing in the document.

5. The method of claim 1, wherein the ranking factor information includes the number of times the keyword appears in the identified document and the proximity of the keyword to other keywords appearing in the document.

6. The method of claim 1, wherein the list if a two-way list which is usable in converting a search term from a first language to a second language and from a second language to a first language to search documents in one language with synonymous search terms in multiple languages.

7. A method of searching a database including documents written in more than one supported language, the steps of the method comprising:

creating a searching tool using an inverted index table with a two-way list of keyword search terms for converting keyword search terms in one language to keyword search terms with a synonymous meaning in other supported languages;

searching for documents using a query with keyword search terms in any supported language to interrogate the searching tool;

using a computer display screen having portions permitting the separate selection of: a) the keyword search terms; b) the sources to be searched; c) the languages to be searched; and d) the language in which the results are to be presented;

using a search engine responsive to keyword search terms from the searching tool in to both the search language and other supported languages to identify a document in one supported language that contains certain key words in the one supported language and at least one other key word only in at least one other supported language; and providing a list of retrieved documents in the language in which the results are to be presented based on the keyword search terms in the query language and their aligned synonyms in other supported languages.

8. The method of claim 7 including the step of converting the search results into another language.

9. The method of claim 8, wherein the method further includes the step of providing an ordered list, in the language the results are to be presented, of documents based on ranking information in the search tool.

10. The method of claim 7, wherein the step of providing the search list of documents in a supported language selected by the searcher when the document exists in that language.

11. The method of claim 7, wherein sources to be searched for documents in the database can be set to particular document depositories, depositories in particular countries and/or all sources of documents.

12. The method of claim 7, wherein the step of creating the searching tool includes the following steps:

using an extractor to extract keywords from each of the documents;

translating the extracted keywords into the supported languages by using a keyword dictionary;

creating a listing of keywords for each of the documents in each supported language; and using the keywords in each supported language to create the inverted index of the documents including the keywords.

13. A system for searching a database of documents in a plurality of different supported languages based on an input search, the system comprising:

a list of keywords which includes, for each of a plurality of documents in the database, keywords with synonymous meanings in at least a first and a second of the supported languages;

an inverted index for the plurality of documents of the database including the keywords with synonymous meaning in the list, and data associated with each keyword for identifying documents in the database containing the keyword and providing ranking factor information for the keyword relative to the identified documents; and a search engine responsive to input keywords in the first language to interrogate documents with keywords in both the first and second languages, said search engine using the inverted index to obtain a set of results which include the documents which contain input keyword search terms in the first language and in the second language.

14. A system of the type described in claim 13, wherein the list of keywords is a two-way list which is usable in converting a keyword search term from the first language to the second language and from the second language to the first language to interrogate documents in one of the two languages with synonymous search terms in both languages.

15. The system of claim 14 including a computer display screen having separate portions permitting separate selection of: a) the keyword search terms; b) sources to be searched for documents in the database; c) the languages to be searched; and d) identification of the languages in which the results are to be presented.

16. A searching system of the type described in claim 14, wherein the converting of search terms uses a Unicode system for managing multiple languages.

17. The system of claim 13, wherein sources to be searched for documents in the database can be set to any one of particular document depositories, depositories in particular countries and/or all sources.

18. A computer program on a computer usable medium for searching a database of documents based on an input search, the computer program comprising:
   computer program for a list of keywords which includes, for each of a plurality of documents in the database, keywords with synonymous meanings in at least a first and a second language, with information associated with the keyword identifying documents containing the keyword and providing ranking information for the keyword relative to each identified document;
   computer program for a display screen having separated portions permitting the individual selection of: a) the keyword search terms; b) the sources to be searched; c) the language to be searched and d) the language the results are to be presented in;
   computer program for an inverted index for the plurality of documents of the database including the keywords with synonymous meaning in the list; and
   computer program for a search engine responsive to keywords entered in the display screen in one of the first and second languages, said search engine using the inverted index to obtain a set of results which include the documents which contain input keyword search terms in either the first or in the second language when that is the language the results are to be presented in.

19. The computer program on the computer usable medium of the type described in claim 18, wherein the list is a two-way list which is usable in converting a search term from a first language to a second language and from a second language to a first language to search documents in one language with synonymous search terms in multiple languages.

20. The computer program on the computer usable medium of the type described in claim 19, wherein the converting of search terms uses a Unicode system for managing multiple languages.

21. Computer program on the computer usable medium of claim 18, wherein sources to be searched for documents in the database can be set to particular document depositories, depositories in particular countries and/or all sources.

* * * * *